US008425359B1

(12) United States Patent
Holmes et al.

(10) Patent No.: US 8,425,359 B1
(45) Date of Patent: Apr. 23, 2013

(54) FOUR-MODE HYBRID TRANSMISSION

(75) Inventors: Alan G. Holmes, Clarkston, MI (US); Brendan M. Conlon, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/494,165

(22) Filed: Jun. 12, 2012

(51) Int. Cl.
  *F16H 3/72* (2006.01)
(52) U.S. Cl.
  USPC .......................................................... 475/5
(58) Field of Classification Search .............. 475/5, 279, 475/286, 290, 900
  See application file for complete search history.

(56) References Cited

U.S. PATENT DOCUMENTS

| | | | |
|---|---|---|---|
| 6,551,208 B1 | 4/2003 | Holmes et al. | |
| 7,387,585 B2 * | 6/2008 | Bucknor et al. | 475/5 |
| 7,645,206 B2 * | 1/2010 | Holmes et al. | 475/5 |
| 8,021,256 B2 | 9/2011 | Conlon et al. | |
| 2006/0025259 A1 | 2/2006 | Klemen et al. | |
| 2008/0015073 A1 * | 1/2008 | Raghavan et al. | 475/5 |
| 2009/0281694 A1 * | 11/2009 | Conlon et al. | 701/51 |
| 2012/0149515 A1 * | 6/2012 | Holmes et al. | 475/5 |

* cited by examiner

*Primary Examiner* — David D Le
*Assistant Examiner* — David J Hlavka
(74) *Attorney, Agent, or Firm* — Quinn Law Group, PLLC

(57) ABSTRACT

A hybrid transmission includes an input member and an output member. The transmission includes a first and a second motor/generator, and a first, second, and third planetary gear set. The input member is continuously connected for common rotation with a member of the first planetary gear set. The output member is continuously connected for common rotation with a member of the third planetary gear set. An interconnecting member is continuously connected for common rotation with a member of each of the first, second, and third planetary gear sets. A plurality of torque-transmitting mechanisms includes a torque-transmitting mechanism that is selectively engageable to connect the interconnecting member to another member of the third planetary gear set. The motor/generators and the torque-transmitting mechanisms are selectively engageable in different combinations to provide four electric-only operating modes.

15 Claims, 2 Drawing Sheets

|     | 12   | 60 | 62 | 64 | 66 | 68 |
|-----|------|----|----|----|----|----|
| 100 | ---- | X  |    |    |    | X  |
| 102 | ---- | X  |    | X  |    | X  |
| 104 | ---- |    | X  |    |    | X  |
| 106 | ---- |    | X  | X  |    | X  |
| 108 | ---- | X  |    |    | X  | X  |
| 110 | ↑    | X  |    | X  |    |    |
| 112 | ↑    | X  |    |    | X  |    |
| 114 | ↑    |    | X  | X  |    |    |
| 116 | ↑    |    | X  |    | X  |    |
| 118 | ↑    | X  |    |    |    |    |
| 120 | ↑    | X  |    | X  | X  |    |
| 122 | ↑    |    | X  | X  | X  |    |

*Fig-2*

FOUR-MODE HYBRID TRANSMISSION

TECHNICAL FIELD

The present teachings generally include a hybrid transmission with two motor/generators and three planetary gear sets.

BACKGROUND

Hybrid powertrains for vehicles utilize different power sources under different vehicle operating conditions. A hybrid powertrain with an electrically-variable transmission that can provide an input-split operating mode and a compound-split operating mode typically has two or three planetary gear sets and one or more motor/generators. The different operating modes are established by engaging brakes and/or clutches in different combinations and controlling the engine and motor/generators. The various power-split operating modes are advantageous, as they may be used to improve fuel economy by allowing the engine to operate at its most fuel efficient speed. A hybrid powertrain may also operate in an electric-only operating mode, in which only one or more motor/generators provide power to the transmission.

SUMMARY

A hybrid powertrain is provided with a transmission that provides four electric-only operating modes, including high speed electric-only operation. Specifically, a hybrid transmission includes an input member and an output member. The transmission includes a first and a second motor/generator, and a first, a second, and a third planetary gear set. The input member is continuously connected for common rotation with a member of the first planetary gear set. As used herein, "common rotation" means rotation at the same speed. The output member is continuously connected for common rotation with a member of the third planetary gear set. The first motor/generator is continuously connected for common rotation with another member of the first planetary gear set. The second motor/generator is continuously connected for common rotation with a member of the second planetary gear set. An interconnecting member is continuously connected for common rotation with a respective member of each of the first, the second, and the third planetary gear sets that is not connected for common rotation with the input member, the output member or either of the motor/generators. A plurality of torque-transmitting mechanisms are each selectively engageable to connect a member of one of the planetary gear sets either to another member of one of the planetary gear sets or to a stationary member. As used herein, a stationary member is a member that does not rotate during operation of the transmission. For example, the stationary member may be a transmission housing.

The plurality of torque-transmitting mechanisms includes a torque-transmitting mechanism that is selectively engageable to provide common rotation of the members of the third planetary gear set and therefore to provide direct drive from the interconnecting member to the output member. The motor/generators and the torque-transmitting mechanisms are selectively engageable in different combinations to provide four electric-only operating modes powered by one or both motor/generators. As used herein, an "electric-only" operating mode is an operating mode in which only power sources relying on electric power, such as electric motors, are used to power the transmission. The electric-only operating modes include both relatively high torque operating modes and relatively high speed operating modes, and both one motor and two motor operation. One of the electric-only operating modes is a two-motor electric-only operating mode with a direct drive through the third planetary gear set, appropriate for relatively high speed, low torque electric-only operation.

Four electrically-variable operating modes are also available including both input-split and compound-split operation.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 2 is a table illustrating an engagement schedule for torque-transmitting mechanisms to establish various operating modes of the transmission of FIG. 1.

DETAILED DESCRIPTION

Figure 1:
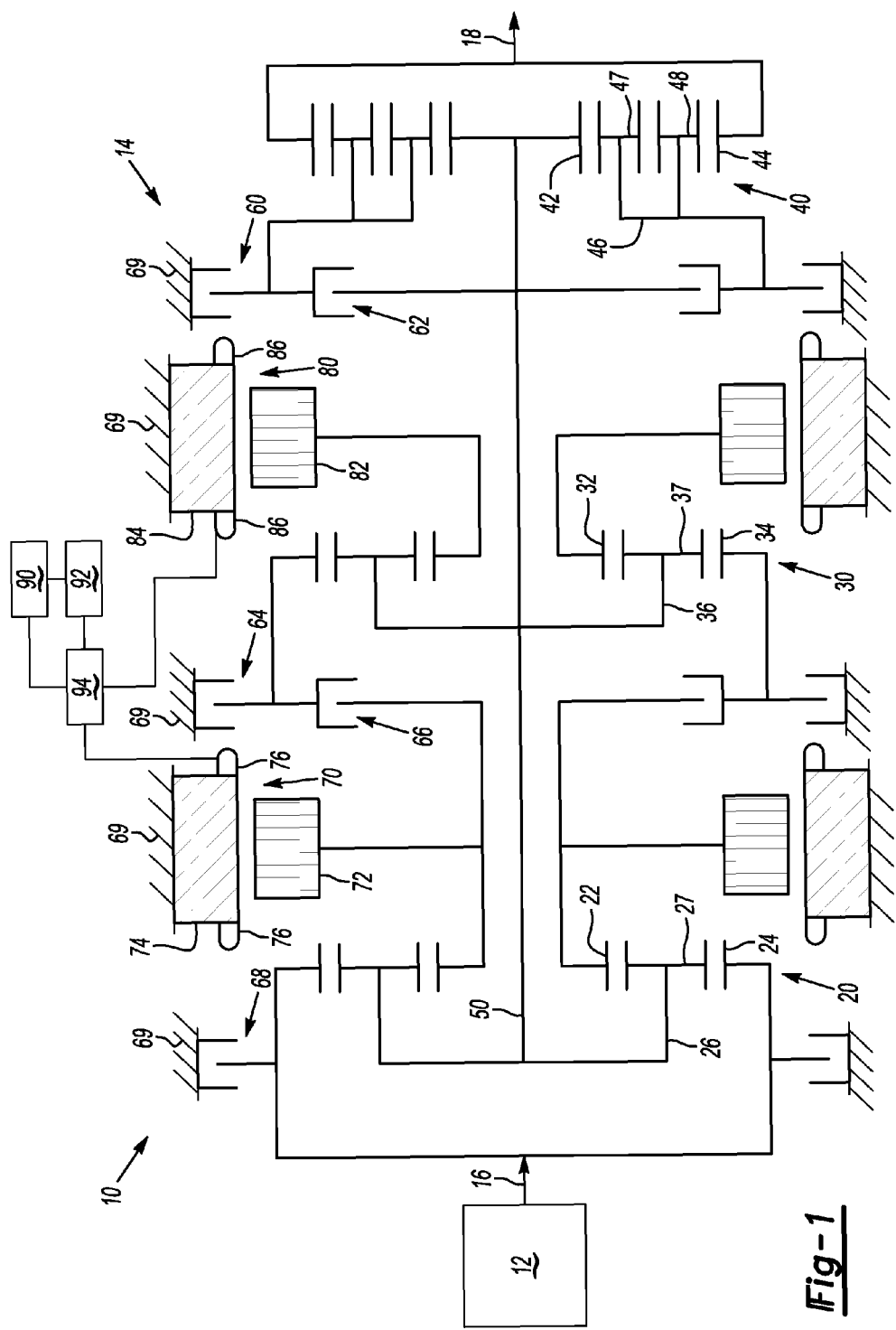
FIG. 1 is a schematic cross-sectional illustration of a hybrid powertrain showing a transmission in stick diagram form.

Referring to the drawings, wherein like reference numbers refer to like components throughout the several views, FIG. 1 shows a powertrain 10 that includes an engine 12, and an electrically-variable transmission 14 with an input member 16 and an output member 18. The input member 16 is connected for common rotation with the engine 12, and the output member 18 is connected for common rotation with a final drive mechanism (not shown) to deliver tractive torque to vehicle wheels. The transmission 14 includes three planetary gear sets 20, 30, and 40, five torque-transmitting mechanisms 60, 62, 64, 66 and 68, and two motor/generators 70, 80. The torque-transmitting mechanisms 60, 62, 64, 66 and 68 and the motor/generators 70, 80 are controllable to provide four electric-only operating modes and four electrically-variable operating modes as described herein. The transmission 14 may also be controlled to provide an additional electric-only operating mode, a torque converter operating mode, and two fixed ratio operating modes as described herein. The transmission 14 is configured so that the third planetary gear set 40 can provide either a reduction gear ratio or a direct drive ratio, depending on which of the torque-transmitting mechanisms are engaged, allowing both high torque and high speed operation.

The planetary gear set 20 includes a sun gear member 22, a ring gear member 24, and a carrier member 26. The carrier member 26 rotatably supports a plurality of pinion gears 27 that are disposed in meshing relationship with both the sun gear member 22 and the ring gear member 24. In the embodiment shown, the ring gear member 24 has 93 teeth and the sun gear member 22 has 47 teeth, establishing an effective gear ratio of 1.98 for the planetary gear set 20, although other tooth counts may be used.

The planetary gear set 30 includes a sun gear member 32, a ring gear member 34, and a carrier member 36 that rotatably supports a plurality of pinion gears 37 that are disposed in meshing relationship with both the sun gear member 32 and the ring gear member 34. The ring gear member 34 has 93 teeth and the sun gear member 32 has 47 teeth, establishing an effective gear ratio of 1.98 for the planetary gear set 30, although other tooth counts may be used.

The planetary gear set 40 includes a sun gear member 42, a ring gear member 44, and a carrier member 46. The carrier member 46 rotatably supports a first set of pinion gears 47 as well as a second set of pinion gears 48. The first set of pinion gears 47 is disposed in meshing relationship with both the sun gear member 42 and the second set of pinion gears 48. The second set of pinion gears 48 is disposed in meshing relationship with the first set of pinion gears 47 and with the ring gear member 44. Thus, the planetary gear set 40 is a compound, sun gear member-pinion gear-pinion gear-ring gear member gear set, referred to herein as a S-P-P-R gear set. The ring gear member 44 has 107 teeth and the sun gear member 42 has 47 teeth. The effective gear ratio of an S-P-P-R gear set such as planetary gear set 40 is:

$(N_R/N_S)-1$; the ratio of the number of teeth of the ring gear member 44 to the number of teeth of the sun gear member 42, less one.

In the S-P-P-R gear set 40, the speed of the ring gear member 44 is the weighted average of the speeds of the sun gear member 42 and the carrier member 46. The torque into the sun gear member 42 and the torque into the carrier member 46 sum to the torque out of the ring gear member 44. An object of using an S-P-P-R gear set is to provide a gear set which is in equilibrium with similar amounts of torque applied in the same direction to two of its members: the sun gear member 42 and the carrier member 46. Thus, in another aspect of the present teachings, the connections made to these members of the third planetary gear set 40 could be exchanged with one another and the same operating modes would be available.

An interconnecting member 50 continuously connects the carrier member 26, the carrier member 36, and the sun gear member 42. The interconnecting member 50 may be a single component, such as a main shaft with radially-extending hub portions as shown. The interconnecting member 50 may alternatively be two separate components, one connecting the carrier members 26 and 36, and another connecting carrier member 36 with sun gear member 42. No other interconnecting members are included as no other members of the planetary gear sets 20, 30 or 40 are continuously connected for common rotation.

The electrically-variable transmission 14 also includes two motor/generators 70 and 80. The motor/generator 70 includes an annular rotor portion 72 that is connected for common rotation with the sun gear member 22 by a rotor hub and a sleeve shaft that concentrically surrounds the interconnecting member 50. The motor/generator 70 has an annular stator 74 that surrounds the rotor 72. Electrical windings 76 extend from ends of the stator 74.

The motor/generator 80 includes an annular rotor portion 82 that is connected for common rotation with the sun gear member 32 by a rotor hub and a sleeve shaft that concentrically surrounds the interconnecting member 50. The motor/generator 80 has an annular stator 84 that surrounds the rotor 82. Electrical windings 86 extend from ends of the stator 84.

The motor/generators 70, 80 may receive electrical power from or provide electrical power to an energy storage device 90 such as one or more batteries or a fuel cell. An electronic controller 92 is in signal communication with the energy storage device 90 and with a power inverter 94 that is also in electrical communication with the stator portions of the motor/generators 70, 80. The controller 92 responds to a variety of input signals including vehicle speed, operator demand, the level at which the battery 90 is charged and the power being provided by the engine 12. The controller 92 regulates the flow of power between the motor/generators 70, 80 and the energy storage device 90 via the inverter 94, which converts between direct current provided or utilized by the energy storage device 90 and alternating current provided or utilized by the stators 74, 84 of the motor/generators 70, 80.

The electrically-variable transmission 14 also includes a plurality of torque-transmitting mechanisms 60, 62, 64, 66 and 68. A first torque-transmitting mechanism 60 is a brake that is selectively engageable to ground the carrier member 46 to a stationary member 69, such as a casing of the transmission. A second torque-transmitting mechanism 62 is a clutch that is selectively engageable to connect sun gear member 42 for common rotation with carrier member 46. A third torque-transmitting mechanism 64 is a brake that is selectively engageable to ground the ring gear member 34 to the stationary member 69. A fourth torque-transmitting mechanism 66 is a clutch that is selectively engageable to connect the sun gear member 22 and the rotor 72 of the motor/generator 70 for common rotation with the ring gear member 34. A fifth torque-transmitting mechanism 68 is a brake that is selectively engageable to ground the ring gear member 24 to the stationary member 69. In so doing, torque-transmitting mechanism 68 also connects the input member 16 and the engine 12 to the stationary member 69 and thus may be referred to as an engine brake.

By engaging the torque-transmitting mechanisms in various combinations and controlling the motor/generators 70, 80, the transmission 14 provides four electric-only operating modes, four electrically-variable operating modes, two fixed gear ratios, an electric-torque converter operating mode, and an additional optional electric-only operating mode (a fifth electric-only operating mode). All of these operating modes are "forward" operating modes in that propulsion is provided at the output member 18 in a direction that causes a vehicle with the powertrain 10 to move in a forward direction. In one embodiment, the torque-transmitting mechanisms 60, 62, 64, 66 and 68 can be friction plate clutches or another type of clutch capable of transmitting reverse torque, in which case the four electric-only operating modes can be used for regenerative braking, when one or both motor-generators 70, 80 are controlled to operate as generators, and for reverse propulsion when one or both motor-generators 70, 80 are controlled to rotate in an opposite direction than when providing forward propulsion. The engagement schedule of the torque-transmitting mechanisms 60, 62, 64, 66 and 68, as well as the state of the engine 12 is shown in the table of FIG. 2. The various operating modes are numbered 100-122 and are represented as different rows. The engine 12 and torque-transmitting mechanisms are indicated with their respective reference numbers listed in different columns. For each operating mode in which the engine 12 is not providing power to the input member 16, dashed lines appear under the column labeled 12. When the engine 12 is connected to and providing power to the input member 16, an arrow appears in the column labeled 12. An "X" listed in a cell corresponding with a given operating mode (the row) and a given torque-transmitting mechanism (the column) indicates that the torque-transmitting mechanism is engaged during that operating mode. Where no "X" is listed, the torque-transmitting mechanism is not engaged during that operating mode.

To establish a first electric-only operating mode, indicated as mode 100 in FIG. 2, the torque-transmitting mechanisms 60 and 68 are engaged. The input member 16 and ring gear member 24 are grounded to the stationary member 16 and the engine 12 is off. The first motor/generator 70 is controlled to function as a motor and the motor/generator 80 is unpowered. With the ring gear member 24 and the carrier member 46 grounded, the planetary gear sets 20 and 40 are active. A planetary gear set is "active" when each of its members is connected to a member of another planetary gear set, to an input member, to an output member, to a motor/generator or to an engine, so that it is able to carry torque. Torque is provided through the planetary gear sets 20 and 40 from the motor/generator 70 to the output member 18. With the torque-transmitting mechanism 60 engaged, the third planetary gear set 40 reduces speed and multiplies torque from the sun gear member 42 to the ring gear member 44.

To shift from the first electric-only operating mode 100 to establish the second electric-only operating mode, indicated as mode 102 in FIG. 2, the torque-transmitting mechanisms 60 and 68 remain engaged and the torque-transmitting mechanism 64 is engaged. The ring gear member 24, carrier member 46 and ring gear member 34 are grounded, and the engine 12 is off. Because the torque-transmitting mechanism 64 is engaged, the second planetary gear set 30 is also active, and the motor/generator 80 is also controlled to function as a motor, so that both the first motor/generator 70 and the second motor/generator 80 provide torque to the transmission 14. With the torque-transmitting mechanism 60 engaged, the third planetary gear set 40 provides a reduction ratio in the second electric-only operating mode.

To shift from the second electric-only operating mode 102 to a third electric-only operating mode indicated as mode 104 in FIG. 2, the torque-transmitting mechanism 68 remains engaged, while torque-transmitting mechanisms 60 and 64 are disengaged and torque-transmitting mechanism 62 is engaged. This shift may be made in a sequence that is referred to as a hot shift, in that the torque-transmitting mechanism 62 slips under load during engagement prior to the disengagement of torque-transmitting mechanism 60, so that torque is provided to the output member 18 during the shift. With only torque-transmitting mechanisms 62 and 68 engaged, the planetary gear sets 20 and 40 are active and planetary gear set 30 is inactive. The torque-transmitting mechanism 62 connects the sun gear member 42 for common rotation with the carrier member 46. Accordingly, the third planetary gear set 40 functions as a direct drive, without torque multiplication or reduction between the interconnecting member 50 and the output member 18. Only motor/generator 70 provides power to the transmission 14 at the sun gear member 22. Because direct drive is provided from the interconnecting member 50 to the output member 18 instead of a speed reduction, the third electric-only operating mode is appropriate for higher speed and lower torque requirements than the first and second electric-only operating modes.

To shift from the third electric-only operating mode 104 to a fourth electric-only operating mode indicated as mode 106 in FIG. 2, torque-transmitting mechanisms 62 and 68 remain engaged and torque-transmitting mechanism 64 is engaged. The ring gear member 24 and ring gear member 34 are grounded, and the engine 12 is off. Because the torque-transmitting mechanism 64 is engaged, the second planetary gear set 30 is also active. In addition to motor/generator 70, the motor/generator 80 is also controlled to function as a motor, so that both the first motor/generator 70 and the second motor/generator 80 provide torque to the transmission 14. With the torque-transmitting mechanism 62 engaged, the third planetary gear set 40 provides a direct drive ratio between the interconnecting member 50 and the output member 18 in the fourth electric-only operating mode.

The first and third electric-only operating modes 100, 104 are one-motor electric-only operating modes in the speed reduction and the direct drive output ranges of the third planetary gear set 40, respectively. The second and fourth electric-only operating modes 102, 106 are two-motor electric-only operating modes in the speed reduction and the direct drive output ranges of the third planetary gear set 40, respectively.

Motor/generator 70 is used in the one-motor operating modes and both motor/generators 70 and 80 are used in the two-motor operating modes.

To accomplish electric-only operation of a vehicle propelled by the powertrain 10, the transmission 14 can be shifted among the first, second, third, and fourth electric-only operating modes in response to demands for speed and torque from the output member 18. For low speed and low torque, the first electric-only operating mode, a one-motor operating mode with speed reduction through the third planetary gear set 40, may be most useful. For low speed and high torque, the second electric-only operating mode, with a two-motor operating mode with speed reduction may be most useful. For high speed and low torque, the third electric-only operating mode, a one-motor operating mode with direct drive though the third planetary gear set 40, may be most useful. For high speed and high torque, the fourth electric-only operating mode, a two-motor operating mode with direct drive may be most useful.

The transmission 14 can shift between one-motor electric-only operating modes (100 or 104) and two-motor electric-only operating modes (102 or 104) by engaging or disengaging a single torque-transmitting mechanism 60 or 62, as is apparent in FIG. 2. The transmission 14 can shift between speed reduction and direct drive, through the third planetary gear set 40, by engaging a single torque-transmitting mechanism and disengaging a single torque-transmitting mechanism. Both of these shifts are relatively easy to accomplish. The single-transition shift between speed reduction and direct drive through the third planetary gear set 40 (shifting between mode 102 and mode 104) is relatively easy to accomplish while providing torque to the output member 14 without interruption, if the torque-transmitting mechanisms 60 and 62 are friction devices such as a wet-plate clutch and a wet-plate clutch-brake, respectively.

One additional two-motor electric-only operating mode 108 is available when torque-transmitting mechanisms 60, 66 and 68 are engaged, as indicated in FIG. 2. The third planetary gear set 40 is in the reduction output range in this operating mode. Operating mode 108 can be accomplished by a shift from the second electrically-variable operating mode discussed herein, by reducing the speed of the input member 16 to zero, and then engaging the torque-transmitting mechanism 68 (the engine brake). In operating mode 108, the first and the second planetary gear sets 20 and 30 are compounded together by the interconnecting member 50 and the action of the torque transmitting mechanism 66, so that the rotor 82 of the second motor/generator 80 rotates in the opposite direction as the output member 18.

The transmission 14 may be controlled to establish four electrically-variable operating modes 110-116 according to the engagement schedule of FIG. 2. Two of the electrically-variable operating modes are input-split operating modes and two of the electrically-variable operating modes are compound-split operating modes. In general, an input-split mode uses gearing to split the power flow through the transmission 14 from input member 16 to output member 18 by speed in closest association with the input member 16, while a compound-split mode uses gearing to split the power flow through the transmission 14 by speed in essentially equal association with both input member 16 and output member 18. That is, in an input-split mode, the speed of the input member 16 is not directly proportional to the speeds of either of the motor/generators 70, 80 but the speed of the output member 18 is directly proportional to the speed of motor/generator 80. In a compound-split mode neither the speed of the input member 16 nor the speed of the output member 18 is directly proportional to the speed of either of the motor/generators 70, 80.

A first electrically-variable operating mode 110 is established by engaging torque-transmitting mechanisms 60 and 64 with the engine 12 on. To shift to the first electrically-variable operating mode 110 from the first electric-only operating mode 100, the torque-transmitting mechanism 68 is released, and a portion of the torque from the motor/generator 70 is applied to the input member 16 through the planetary gear set 20 to start the engine 12. The torque-transmitting mechanism 64 is also engaged so that the planetary gear set 30 is active. This allows motor/generator 80 to be used in addition to motor/generator 70 to establish an input-split operating mode. Power delivered from the engine 12 and power delivered from or to the motor/generator 70 is split through the first planetary gear set 20 and provided to the carrier member 26.

The torque-transmitting mechanisms 60 and 64 are engaged, the engine 12 is accelerated from the idle speed to a desired speed, and then the speed of the motor/generator 70 (operating as a generator) is decreased, and the speed of the motor/generator 80 (operating as a motor) is increased. This operation will continue, with the transmission ratio decreasing, until the speed of motor/generator 70 is zero, establishing a mechanical point. This is the end of the first forward electrically-variable mode of operation, because at this particular ratio the transmission can most easily be shifted into the next mode of operation in the progression of transmission ratios. The first electrically-variable mode of operation is an input-split type of power transmission.

At the first mechanical point of operation, with the speed of motor/generator 70 at zero, the ring gear member 34 is stationary, as held by the torque-transmitting mechanism 64, and the speed of the motor/generator 80 is also zero. At this point, the states of torque-transmitting mechanisms 64 and 66 can be interchanged in a synchronous condition, such that there is no slippage involved in either the engagement or disengagement of the mechanisms. It should also be noted that at this point of operation, the transmission 14 is operating in a substantially mechanical power flow arrangement (hence the term "mechanical point"), the shaft power being transmitted by the electric motor/generators 70, 80 is negligible. The first mechanical point is the end of operation in the first electrically-variable mode and the beginning of operation in the second electrically-variable mode as the transmission ratio decreases.

A second electrically-variable operating mode 112 is established by engaging torque-transmitting mechanisms 60 and 66. In the transmitting of mechanical power from the input member 16 to the output member 18, that is without considering added power from the energy storage device 90, the operation of the motor/generator 80 is being changed from operating as a motor to operating as a generator. Also at this interchange point, without added electrical power, the operation of motor/generator 70 changes from a generator mode to a motor mode. The speed of the engine 12 can be held at a desired speed throughout the second electrically-variable mode, or it can be varied as desired. To have the advantage of synchronous shifting from one mode to another, it is preferred that the ratio of the speed of the input member 16 to the speed of the output member 18 remains between that of the first mechanical point and that of the second mechanical point while the transmission 14 is operating in the second electrically-variable mode.

In the second electrically-variable operating mode, 112, all of the planetary gear sets 20, 30, 40 are active, and the third planetary gear set 40 provides a speed reduction from the interconnecting member 50 to the output member 18. The second electrically-variable operating mode 112 is a compound-split operating mode.

At the first mechanical point, which in this embodiment is the beginning of the second electrically-variable mode, the motor/generator 70 can provide all of the torque necessary for reaction of the torque provided to the input member 16 without using or supplying mechanical power, because motor/generator 70 is stationary. At a second mechanical point, which is at the end of the second electrically-variable mode, the motor/generator 80 can supply all of the torque necessary for reaction of the torque provided to the input member 16 without using or supplying mechanical power, because motor/generator 80 is stationary. Between these two points, the motor/generators 70 and 80 share the task of providing reaction torque, such that this load can be transferred gradually from motor/generator 70 to motor/generator 80 through the second electrically-variable mode. In the absence of battery power and electrical accessory loads, this load is transferred so that electrical power generated by motor/generator 80 is consumed by motor/generator 70, so the net effect is simply to transmit power from the input member 16 to the output member 18.

To continue to accelerate the output member 18 (and a vehicle on which the transmission 14 is installed) during the second electrically-variable mode of operation, which is a compound-split mode, the speed of the motor/generator 70 (operating as a motor) is increased from zero in the forward direction and the speed of the motor/generator 80 (operating as a generator) is decreased. Both the motor/generator 70 and the engine 12 impart positive or forward rotation to the carrier member 26, and the motor/generator 80 provides a rotating reaction member at the sun gear member 32. The electrical energy generated by the motor/generator 80 can be utilized to either recharge the energy storage device 90, provide electrical power to drive the motor/generator 70, or to do both depending upon the amount of power needed at the motor/generator 70 and the level of charge of the energy storage device 90.

The powertrain 10 continues to operate in the second electrically-variable mode until the speed of the motor/generator 80 has decreased to zero and the speed of the motor/generator 70 has increased to a maximum value. At this point, the motor/generator 80 has a zero speed, which is equal to the speed of the carrier member 46 as held stationary by the torque-transmitting mechanism 60. This is the second mechanical point. The transmission can continue to decrease its ratio in second forward electrically-variable mode of operation or shift to either the third or the fourth forward electrically-variable mode of operation.

A third electrically-variable mode 114 is established by engaging torque-transmitting mechanisms 62 and 64 while the engine 12 is on. The shift from the second electrically-variable operating mode 112 to the third electrically-variable operating mode 114 is a hot shift, requiring slipping of the torque-transmitting mechanisms, as torque-transmitting mechanisms 62 is engaged and torque-transmitting mechanism 60 is released. Furthermore, the shift from the second electrically-variable operation mode 112 to the third electrically-variable operating mode 114 requires the simultaneous disengagement of torque-transmitting mechanism 66 and engagement of torque-transmitting mechanism 64. If the speed of the engine 12 is to remain constant during this shift, then the speed of the motor/generator 70 must also change during the speed phase of the hot shift. The third planetary gear set 40 provides a direct drive between the interconnecting member 50 and the output member 18 in the third electrically-variable operating mode, as the carrier member 46 rotates at the same speed as the sun gear member 42, causing all members of the planetary gear set 40 to rotate at the same speed. The third planetary gear set 40 provides a ratio step of 2.28 between the second electrically-variable operating mode and the third electrically-variable operating mode.

The third forward electrically-variable mode 114 is also an input-split mode of operation. The speed of a motor/generator 80 is proportional to the speed of the output member 18. During the third forward electrically-variable mode 114, the motor/generator 70 is operated as a generator and the motor/generator 80 is operated as a motor. The speed of motor/generator 70 decreases in magnitude while the speed of the motor/generator 80 increases. During the third forward electrically-variable mode of operation, the motor/generator 70 supplies electrical power to the transmission 14 which can be utilized to power the motor/generator 80 as a motor and/or provide energy to the energy storage device 90 connected thereto to increase the battery storage charge. The third forward electrically-variable mode of operation can continue until the output member reaches its maximum speed point for the customary use of that mode, at which the speed of motor/generator 80 is zero, i.e., a third mechanical point.

A fourth electrically-variable operating mode 116 is established by engaging the torque-transmitting mechanisms 62 and 66 while the engine 12 is on. The fourth planetary gear set 40 provides a direct drive from the interconnecting member 50 to the output member 18 in the fourth electrically-variable operating mode 116 because the carrier member 46 rotates at the same speed as the sun gear member 42, causing all members of the planetary gear set 40 to rotate at the same speed. The fourth electrically-variable operating mode 116 is also a compound-split mode of operation, where the task of providing reaction torque to transmit torque and power from the input member 16 to the output member 18 is gradually changed from one motor/generator 70 to the other motor/generator 80 as the transmission ratio changes from one mechanical point in that mode to the other mechanical point. The shift from the second electrically-variable operation mode 112 to the fourth requires a hot shift, slipping the torque transmitting mechanisms as torque transmitting mechanism 62 is engaged and torque-transmitting mechanism 60 is released, but the engagement status of the other torque-transmitting mechanisms 64, 66 does not change. If the engine speed 12 is to remain constant during this shift, then the speeds of the motor/generators 70, 80 must also change during the speed phase of the hot shift.

The four electrically-variable operating modes include both relatively high torque (electrically-variable operating modes 110 and 112) and relatively high speed (electric-only operating modes 114 and 116). High torque electrically-variable operating modes 110 and 112 result in a relatively high torque at the output member 18. High speed electrically-variable operating modes 114 and 116 result in relatively high speed at the output member 18. Additionally, both input-split and compound-split operation is available in both the high torque operating modes and the high speed operating modes. Thus, the ratio step between the first or the second electrically-variable operating modes 110 and 112 and the third or the fourth electrically-variable operating modes 114 and 116 is 2.28 (the gear ratio of the third planetary gear set 40) in the embodiment shown. The shift between the first electrically-variable operating mode 110 and the third electrically-variable operating mode 114 is a single-transition, i.e. requiring the engagement of a single torque-transmitting mechanism 62 and the disengagement of a single torque-transmitting mechanism 60. Likewise, the shift between the second elec-trically-variable operating mode 112 and the fourth electrically-variable operating mode 116 is a single-transition shift. The engine speed may be held constant during these shifts by varying the speeds of the motor/generators 70, 80 and thus by varying the speed ratio between the input member 16 and the interconnecting member 50 by the same ratio step in the opposite sense. That is, when the torque-transmitting mechanisms 60, 62 are shifted, the ratio between the interconnecting member 50 and the output member 18 is changed by either 2.28:1 or 1:2.28. The motor/generators 70, 80 and forward gear sets 20, 30 can be used to change the ratio from the input member 16 to the interconnecting member 50 by either 1:2.28 or 2.28:1, respectively, so that the overall ratio between the input member 16 and the output member 18 remains essentially constant.

When the engine 12 is on and only the torque-transmitting mechanism 60 is engaged, with motor/generator 70 controlled to function as a generator or as a motor and motor/generator 80 not powered, the transmission 14 is in an electric torque converter mode 118. In the electric torque converter mode 118, the engine 12 and the motor/generator 70 provide a torque-combining operating mode through the planetary gear set 20. If the speed of the motor/generator 70 is kept relatively low and motor/generator 70 is operated as a generator, then the losses incurred by the motor/generator 70 are minimal and the electric torque converter operating mode can be sustained for a relatively long period of time. Furthermore, if the engine 12 is stopped torque-transmitting mechanism 68 is engaged, the transmission 14 will shift from the electric torque converter operating mode 118 to the first electric-only operating mode 100.

The transmission 14 also provides two fixed ratio modes of operation 120, 122. A first fixed ratio mode of operation 120 is provided by engaging torque-transmitting mechanisms 60, 64 and 66, preferably at the first mechanical point established between the first and second forward electrically-variable modes 110, 112, when the speed of motor/generator 70 is zero. A second fixed ratio mode 122 is established by engaging torque-transmitting mechanisms 62, 64 and 66, preferably at the third mechanical point when the speed of motor/generator 70 is zero.

Moreover, because of the particular ratios of the planetary gear sets, especially the ratios of the first and second planetary gear sets 20, 30 in the embodiment shown, the maximum torque required from motor/generator 70 is the same as that required from motor/generator 80, allowing them to be of identical size. Furthermore, a substantially identical ratio spread is established in the second and third electrically-variable modes 112, 114.

There are other combinations of engagements of the torque-transmitting mechanisms that will permit other operating conditions. For example, the torque-transmitting mechanisms 64 and 66 can be engaged simultaneously, with the motor/generator 80 utilized as a motor to supply power to the interconnecting member 50 and thereby provide starting torque for the engine 12. If all four of the torque-transmitting mechanisms 60, 62, 64 and 66 are engaged simultaneously, the input shaft 16 and the output shaft 18 are effectively grounded and therefore no power can be transmitted, thus producing a "parking brake" arrangement. The simultaneous disengagement of all of the torque-transmitting mechanisms provides a mechanical neutral condition. The simultaneous disengagement of torque-transmitting mechanisms 60 and 62 in particular provides essentially zero torque on the output member 18.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A hybrid transmission comprising:
an input member and an output member;
a first and a second motor/generator;
a first, a second, and a third planetary gear set; wherein the input member is continuously connected for common rotation with a member of the first planetary gear set; wherein the output member is continuously connected for common rotation with a member of the third planetary gear set; wherein the first motor/generator is continuously connected for common rotation with another member of the first planetary gear set; wherein the second motor/generator is continuously connected for common rotation with a member of the second planetary gear set;
an interconnecting member continuously connected for common rotation with a respective member of each of the first, the second, and the third planetary gear sets that is not connected for common rotation with the input member, the output member or either of the motor/generators;
a plurality of torque-transmitting mechanisms each selectively engageable to connect a member of one of the planetary gear sets to one of a stationary member and another member of one of the planetary gear sets; wherein the plurality of torque-transmitting mechanisms includes a torque-transmitting mechanism that is selectively engageable to connect the interconnecting member to another member of the third planetary gear set; and wherein the motor/generators and the torque-transmitting mechanisms are selectively engageable in different combinations to provide four electric-only operating modes between the input member and the output member;
wherein the torque-transmitting mechanisms are selectively engageable in different combinations to provide four electrically-variable operating modes between the input member and the output member, including two input-split operating modes and two compound-split operating modes when one or both motor/generators are powered and power is provided at the input member; and
wherein the third planetary gear set provides a speed reduction ratio both in one of the two input-split operating modes and in one of the two compound-split operating modes, and provides a direct drive ratio by engaging said torque-transmitting mechanism to connect the interconnecting member to said another member of the third planetary gear set in the other of the two input-split operating modes and the other of the two compound-split operating modes.

2. The hybrid transmission of claim 1, wherein all of the torque-transmitting mechanisms that are engaged in one of the electric-only operating modes are different from the torque-transmitting mechanisms that are engaged in a successive one of the electric-only operating modes.

3. The hybrid transmission of claim 1, wherein the plurality of torque-transmitting mechanisms include another torque-transmitting mechanism that is selectively engageable to ground said another member of the third planetary gear set to the stationary member; and wherein only said another torque-transmitting mechanism is engaged and the first motor/generator is powered to provide an electric torque converter operating mode when power is provided at the input member.

4. The hybrid transmission of claim 1, wherein each of the planetary gear sets has a ring gear member, a carrier member, and a sun gear member; wherein the member of the first planetary gear set that is continuously connected with the input member is the ring gear member of the first planetary gear set; wherein the member of the third planetary gear set that is continuously connected with the output member is the ring gear member of the third planetary gear set; wherein said another member of the first planetary gear that is continuously connected for common rotation with the first motor/generator is the sun gear member of the first planetary gear set; wherein said another member of the second planetary gear set that is continuously connected for common rotation with the second motor/generator is the sun gear member of the second planetary gear set;
wherein the member of the first planetary gear set continuously connected for common rotation with the interconnecting member is the carrier member of the first planetary gear set; wherein the member of the second planetary gear set continuously connected for common rotation with the interconnecting member is the carrier member of the second planetary gear set; and wherein the member of the third planetary gear set continuously connected for common rotation with the interconnecting member is the sun gear member of the third planetary gear set.

5. The hybrid transmission of claim 4, wherein the plurality of torque-transmitting mechanisms include:
a first torque-transmitting mechanism selectively engageable to ground the carrier member of the third planetary gear set to the stationary member;
a second torque-transmitting mechanism selectively engageable to connect the interconnecting member for common rotation with the carrier member of the third planetary gear set;
a third torque-transmitting mechanism selectively engageable to ground the ring gear member of the second planetary gear set to the stationary member;
a fourth torque-transmitting mechanism selectively engageable to connect the sun gear member of the first planetary gear set for common rotation with the ring gear member of the second planetary gear set; and
a fifth torque-transmitting mechanism selectively engageable to ground the ring gear member of the first planetary gear set to the stationary member.

6. The hybrid transmission of claim 5, wherein the transmission is operable to provide a fifth electric-only operating mode when the first, the fourth, and the fifth torque-transmitting mechanisms are engaged.

7. The hybrid transmission of claim 1, wherein the motor/generators are controllable to rotate in either direction to provide both forward propulsion and reverse propulsion in the four electric-only operating modes.

8. The hybrid transmission of claim 1, wherein the ratios of the planetary gear sets are configured so that each of the motor/generators has an identical maximum torque.

9. A hybrid transmission comprising:
an input member and an output member;
a first and a second motor/generator;
a first, a second, and a third planetary gear set; wherein the first and the second planetary gear sets are simple planetary gear sets each having a sun gear member, a ring gear member, and a carrier member supporting a set of pinion gears that mesh with the sun gear member and the ring gear member; wherein the third planetary gear set is a compound planetary gear set having a sun gear member, a ring gear member, and a carrier member that supports a first set of pinion gears that mesh with the sun gear member and a second set of pinion gears that mesh with the ring gear member and with the first set of pinion gears; wherein the input member is continuously connected for common rotation with a member of the first planetary gear set; wherein the output member is continuously connected for common rotation with a member of the third planetary gear set; wherein the first motor/generator is continuously connected for common rotation with another member of the first planetary gear set; wherein the second motor/generator is continuously connected for common rotation with a member of the second planetary gear set;

an interconnecting member continuously connected for common rotation with a respective member of each of the first, the second, and the third planetary gear sets that is not connected for common rotation with the input member, the output member or either of the motor/generators;

five torque-transmitting mechanisms each selectively engageable to connect a member of one of the planetary gear sets to one of another member of one of the planetary gear sets and a stationary member, including a first torque-transmitting mechanism selectively engageable to ground the carrier member of the third planetary gear set to the stationary member and a second torque-transmitting mechanism selectively engageable to connect the carrier member of the third planetary gear set to the interconnecting member; wherein the motor/generators and the torque-transmitting mechanisms are controllable to provide four electric-only operating modes between the input member and the output member, including two electric-only operating modes powered only by the first motor/generator and two electric-only operating modes powered by both the first motor/generator and the second motor/generator functioning as motors;

wherein the plurality of torque-transmitting mechanisms further include:
  a third torque-transmitting mechanism selectively engageable to ground the ring gear member of the second planetary gear set to the stationary member;
  a fourth torque-transmitting mechanism selectively engageable to connect the sun gear member of the first planetary gear set for common rotation with the ring gear member of the second planetary gear set; and
  a fifth torque-transmitting mechanism selectively engageable to ground the ring gear member of the first planetary gear set to the stationary member; and wherein the transmission is operable to provide a fifth electric-only operating mode when the first, the fourth, and the fifth torque-transmitting mechanisms are engaged.

10. The hybrid transmission of claim 9, wherein the torque-transmitting mechanisms are selectively engageable in different combinations to provide four electrically-variable operating modes between the input member and the output member, including two input-split operating modes and two compound-split operating modes when one or both motor/generators are powered and power is provided at the input member.

11. The hybrid transmission of claim 10, wherein the third planetary gear set provides a speed reduction ratio by the first torque-transmitting mechanism both in one of the two input-split operating modes and in one of the two compound-split operating modes, and provides a direct drive ratio by engaging the second torque-transmitting mechanism both in the other of the two input-split operating modes and the other of the two compound-split operating modes.

12. The hybrid transmission of claim 9, wherein all of the torque-transmitting mechanisms that are engaged in one of the electric-only operating modes are different from the torque-transmitting mechanisms that are engaged in a successive one of the electric-only operating modes.

13. The hybrid transmission of claim 9, wherein only the first torque-transmitting mechanism is engaged and the first motor/generator is powered to provide an electric torque converter operating mode when power is also provided at the input member.

14. The hybrid transmission of claim 9, wherein the member of the first planetary gear set that is continuously connected with the input member is the ring gear member of the first planetary gear set; wherein the member of the third planetary gear set that is continuously connected with the output member is the ring gear member of the third planetary gear set; wherein said another member of the first planetary gear that is continuously connected for common rotation with the first motor/generator is the sun gear member the first planetary gear set; wherein said another member of the second planetary gear set that is continuously connected for common rotation with the second motor/generator is the sun gear member of the second planetary gear set;
  wherein the member of the first planetary gear set continuously connected for common rotation with the interconnecting member is the carrier member of the first planetary gear set; wherein the member of the second planetary gear set continuously connected for common rotation with the interconnecting member is the carrier member of the second planetary gear set; and wherein the member of the third planetary gear set continuously connected for common rotation with the interconnecting member is the sun gear member of the third planetary gear set.

15. A hybrid transmission comprising:
an input member and an output member;
a first and a second motor/generator;
a first, a second, and a third planetary gear set; wherein the input member is continuously connected for common rotation with a member of the first planetary gear set; wherein the output member is continuously connected for common rotation with a member of the third planetary gear set; wherein the first motor/generator is continuously connected for common rotation with another member of the first planetary gear set; wherein the second motor/generator is continuously connected for common rotation with a member of the second planetary gear set;

an interconnecting member continuously connected for common rotation with a respective member of each of the first, the second, and the third planetary gear sets not connected for common rotation with the input member, the output member or either of the motor/generators;

a plurality of torque-transmitting mechanisms each selectively engageable to connect a member of one of the planetary gear sets to one of a stationary member and another member of one of the planetary gear sets; wherein the plurality of torque-transmitting mechanisms includes a torque-transmitting mechanism that is selectively engageable to connect the interconnecting member to another member of the third planetary gear set; wherein the motor/generators and the torque-transmitting mechanisms are controllable to provide four electric-only operating modes and four electrically-variable operating modes; wherein the electrically variable operating modes include input-split and compound-split operating modes; and wherein the motor/generators are controllable to rotate in either direction to provide both forward propulsion and reverse propulsion in the four electric-only operating modes.

* * * * *